(12) United States Patent
Samuel et al.

(10) Patent No.: US 9,702,209 B2
(45) Date of Patent: Jul. 11, 2017

(54) ELASTIC PIPE CONTROL AND COMPENSATION WITH MANAGED PRESSURE DRILLING

(71) Applicant: Halliburton Energy Services, Inc., Houston, TX (US)

(72) Inventors: Robello Samuel, Cypress, TX (US); James Randolph Lovorn, Tomball, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 266 days.

(21) Appl. No.: 14/705,344

(22) Filed: May 6, 2015

(65) Prior Publication Data

US 2015/0345239 A1 Dec. 3, 2015

Related U.S. Application Data

(60) Provisional application No. 62/003,228, filed on May 27, 2014.

(51) Int. Cl.
*G06F 19/00* (2011.01)
*E21B 21/08* (2006.01)
*G05B 15/02* (2006.01)

(52) U.S. Cl.
CPC .............. *E21B 21/08* (2013.01); *G05B 15/02* (2013.01)

(58) Field of Classification Search
CPC combination set(s) only.
See application file for complete search history.

(56) References Cited

U.S. PATENT DOCUMENTS

| 4,843,875 A | * | 7/1989 | Kerbart ................... E21B 45/00 |
| | | | 175/40 |
| 5,044,198 A | * | 9/1991 | Ho ........................... E21B 7/04 |
| | | | 175/39 |

(Continued)

FOREIGN PATENT DOCUMENTS

| CN | 2600643 Y | 1/2004 |
| CN | 202194566 U | 4/2012 |
| WO | 2004059123 A1 | 7/2004 |
| WO | 2012106348 A2 | 8/2012 |
| WO | 2015183492 A1 | 12/2015 |

OTHER PUBLICATIONS

Hauz Khas, Downhole Simulation, 2011, ARI Simulation, pp. 1-4.*

(Continued)

*Primary Examiner* — Kidest Bahta
(74) *Attorney, Agent, or Firm* — McDermott Will & Emery LLP (57) ABSTRACT

A method of regulating downhole pressure using managed pressure drilling may include calculating an elasticity of a drill string during a drilling operation using a torque and drag model included in a managed pressure drilling (MPD) control system and calculating a surge pressure and a swab pressure acting on the drill string during the drilling operation using a hydraulics model included in the MPD control system. The surge and swab pressures may be based on movement of the drill string and in accordance with the elasticity of the drill string. The method may further include determining a set point pressure using a real-time hydraulics model and the torque and drag model, and operating a MPD choke system based on the set point pressure to regulate a predetermined downhole pressure at a predetermined location in a wellbore.

23 Claims, 4 Drawing Sheets

(56) References Cited

U.S. PATENT DOCUMENTS

| | | |
|---|---|---|
| 7,054,750 B2 | 5/2006 | Rodney et al. |
| 8,240,398 B2 | 8/2012 | Lovorn et al. |
| 2007/0151763 A1 | 7/2007 | Reitsma et al. |
| 2012/0067590 A1 | 3/2012 | Fossli |
| 2012/0227961 A1* | 9/2012 | Sehsah .................. E21B 21/08 166/250.07 |
| 2013/0118806 A1 | 5/2013 | Hannegan et al. |
| 2013/0146357 A1 | 6/2013 | Lovorn |

OTHER PUBLICATIONS

Wu et al., Drag and Torque Calculations for Horizonttal Wells Simplified for Fileld Use, Apr. 29, 1991, Oil and Gos Journal, Texas A&M University, p. 1-7.*

International Search Report and Written Opinion for PCT/US2015/029431 dated Aug. 13, 2015.

Official Action for Chinese Patent Application No. 201280076443.8 dated Dec. 7, 2015.

Rasmussen et al., Evaluation of MPD Methods for Compensation of Surge-and-Swab Pressures in Floating Drilling Operations, IADC/SPE 108346, 2007.

Samuel et al., Elastic Pipe Control and Compensation for Managed Pressure Drilling Under Sea Wave Heave Conditions, SPE/IADC-173053-MS, Drilling Conference and Exhibition held in London, United Kingdom, Mar. 17-19, 2015.

* cited by examiner

ELASTIC PIPE CONTROL AND COMPENSATION WITH MANAGED PRESSURE DRILLING

CROSS-REFERENCE TO RELATED APPLICATIONS

This application claims benefit of PCT Patent Application PCT/US2015/029431 by Robello Samuel, filed on May 6, 2015, which claims benefit of provisional patent application No. 62/003,228 by Robello Samuel, filed on May 27, 2014, entitled Elastic Pipe Control and Compensation with Managed Pressure Drilling.

BACKGROUND

Over millions of years, subterranean earth formations, such as hydrocarbon reservoirs, undergo geological changes that result in unexpected pressure and rock strength variations. Complex, deep-water and unconventional hydrocarbon reservoirs often exhibit wellbore mechanics that prevent the use of conventional drilling techniques. Managed pressure drilling (MPD) was developed as a group of technologies to more precisely control the annular pressure profile throughout wellbores by creating only a minimal overbalanced annular pressure.

Generally, the formation pore pressure and the fracture pressure increase with the true vertical depth (TVD) of a well. In MPD, for each drilling interval, drilling fluid (i.e., "mud") may be used that exhibits a pressure that is greater than the pore pressure ($P_{pore}$), but less than the fracture pressure ($P_{frac}$), such that a drilling fluid pressure in the annulus lies between the pore pressure and the fracture pressure. The difference, also called window, between downhole $P_{pore}$ and $P_{frac}$ is sufficient so that the equivalent circulating density (ECD) of the drilling fluid remains within the allowable density window. MPD allows operators to keep the ECD within the narrow $P_{pore}/P_{frac}$ pressure window while still maintaining pressures conducive to wellbore stability.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure relates generally to systems and methods for controlling bottom hole pressure using managed pressure drilling (MPD) techniques and, more particularly, to manipulating backpressure on the annulus while taking into account factors that affect ECD, such as fluid density, fluid rheology, elasticity of the drill string, annular fluid velocity, circulating friction and/or hole geometry.

Embodiments of the present disclosure describe systems and methods for improving the accuracy of bottom hole pressure control, while taking into account the up and down motion (i.e., swab and surge, respectively) of the drill string due to sea waves, vessel or rig movement, and the elasticity of the drill string. For deepwater drilling applications, the accuracy of bottom hole pressure control may be improved by incorporating a torque and drag model that calculates the elasticity of the drill string. The torque and drag model is included in the MPD control system that also includes one or more hydraulic models. The resulting dynamic annular pressure control system may calculate in real time the backpressure, or set point, required to maintain a desired downhole pressure. The model imposes this backpressure on the annulus by continuously adjusting a flow control apparatus (e.g., a hydraulically controlled choke) based on real-time data acquisition of actual hole conditions, temperature, pressure and downhole tool data to calculate friction factors in a wellbore.

As will be appreciated, controlling the bottom hole pressure may be beneficial in managed pressure and underbalanced drilling, and in other types of well operations. Preferably, the bottom hole pressure is accurately controlled to prevent excessive loss of fluid into an earth formation surrounding the wellbore, undesired fracturing of the formation, undesired influx of formation fluids into the wellbore, etc. Nitrogen or another gas, or another lighter weight fluid, may be added to the drilling fluid for pressure control. This technique is especially useful, for example, in underbalanced drilling operations.

MPD operations often use a rotating control device (RCD) installed on top of a blowout preventer (BOP) at the wellhead to create a closed system and a drilling choke manifold and backpressure pump to control downhole pressure. Backpressure may be applied to the annulus by variably restricting flow of the drilling fluid through the drilling choke(s). As a result, a constant BHP can be maintained during drilling operations while the mud pumps are on and while the pumps are turned off to make connections.

Figure 1:
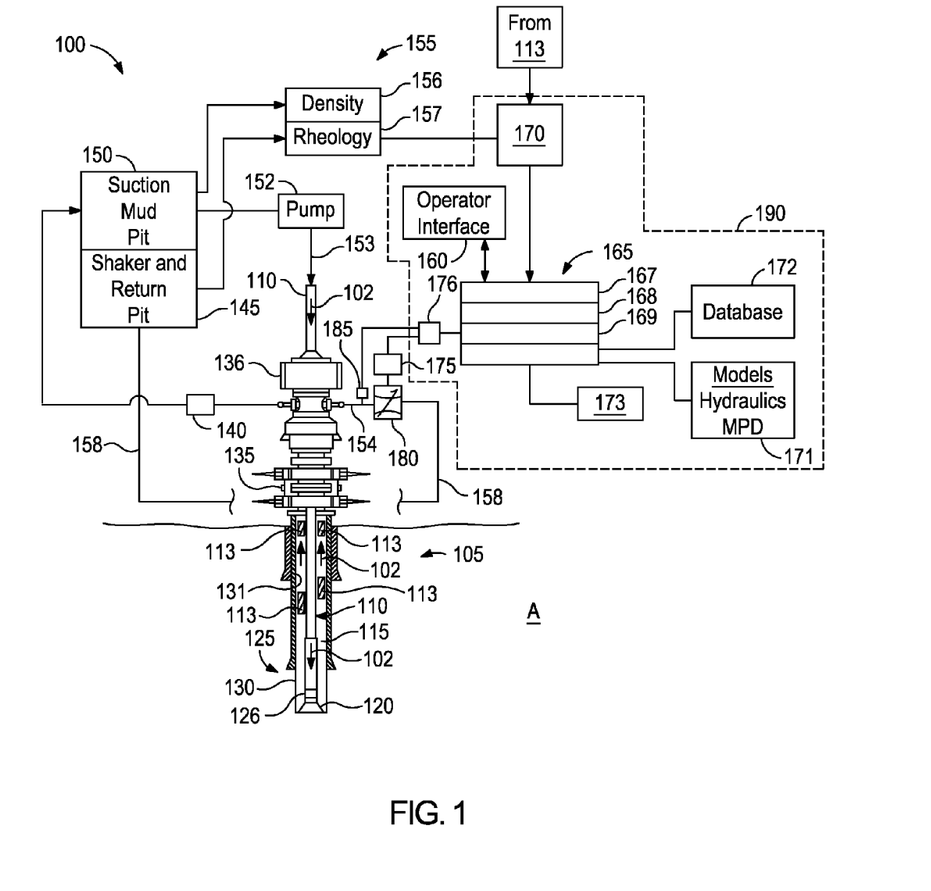
FIG. 1 illustrates a system for controlling wellbore pressure.

FIG. 1 illustrates an exemplary system 100 for controlling a wellbore pressure in at least one portion of the annulus 115 of a well 105. As illustrated, a drill string 110 extends down into a wellbore 130 of the well 105 being drilled through at least one subterranean formation A. The drill string 110 may comprise jointed drill sections, coiled tubing, wired pipe sections, or any combination thereof. The wellbore 130 may be drilled in any direction, for example, vertical, inclined, horizontal, and combinations thereof. A drill bit 120 may be coupled to the drill string 110 at a lower end thereof. A bottom hole assembly (BHA) 125 may be contained or otherwise included in the drill string 110. The BHA 125 may comprise measurement while drilling (MWD) tool and/or logging while drilling (LWD) tool, a mud motor, a hole reamer, one or more stabilizers, a steerable drilling assembly, and other suitable tools known in the art for drilling a well. A drilling fluid 102 is pumped through input line 153 and into drill string 110 by one or more pumps 152. The drilling fluid 102 travels down the interior of the drill string 102 and exits through the drill bit 120 into the annulus 115 defined between the drill string 110 and a wall 131 of the wellbore 130. As the drilling fluid 102 transits up the annulus 115, it picks up drill cuttings from the drilling of the formation A and the properties of the drilling fluid 102 may be modified by adding additional materials.

A rotating pressure control device (RCD) 136 may permit pressure containment in the wellbore 130 by closing off the annulus 115 between the wellbore 130 and the drill string 110, while still permitting the drill string 110 to advance into the wellbore and to rotate. The RCD 136 may be positioned above the blowout preventers (BOP's) 135 at the surface. The drilling fluid 102 may be circulated out of the wellbore 130 and exits between the BOP's 135 and the RCD 136.

The drilling fluid 102 may flow through the return line 154 to a flow control apparatus 180 (also referred to herein as an adjustable choke) after exiting the wellbore 130. In one example, the flow control apparatus 180 may comprise one or more adjustable choke valves. A flow of the drilling fluid 102 through the adjustable choke 180 can be controllably adjusted by actuator 175 to vary the backpressure in the annulus 115. For example, a pressure differential across the adjustable choke 180 may be adjusted to cause a corresponding change in pressure applied to the annulus 115. Thus, a downhole pressure at a predetermined location (e.g., pressure at the bottom of the wellbore 130, pressure at a downhole casing shoe, pressure at a particular formation or zone, etc.) may be regulated by varying the backpressure applied to the annulus 115 at the surface. The actuator(s) 175 may be electrically powered, hydraulically powered, pneumatically powered, or combinations thereof. At a location downstream of flow control apparatus 180, the drilling fluid 102 may return through a line 158 to the return pit 145 where the cuttings are removed. The drilling fluid 102 may then migrate back to suction pit 150 for another trip through the well flow system.

In an example, a hydraulics model and the torque and drag model mentioned above may be used to determine a set point pressure that may be applied to the annulus 115 at, or near, the surface that will result in a downhole annulus pressure at a predetermined location within a predetermined pressure range. In an example, the predetermined pressure range is less than the fracture pressure and no greater than the pore pressure of the surrounding formation A. In underbalanced drilling, for instance, the predetermined pressure range may be less than the pore pressure of the formation A at the predetermined location. An automated control system may operate the flow control apparatus 180 to regulate the pressure applied to the annulus 115 at the surface in order to obtain the desired downhole pressure.

In one embodiment, a real-time system may automatically and continually draw fluid samples from the suction pit 150 and the return pit 145 and input the samples into a real-time fluid properties testing module 155. The fluid properties testing module 155 may comprise, among other things, a density measurement sensor 156 and a rheology sensor 157. In an embodiment, the fluid samples may be regulated to a predetermined temperature and pressure before the fluid properties are measured. In another embodiment, separate real time fluid properties testing modules 155 may be used to test each of the input flow and return flow simultaneously. Rheological properties of interest of the input and return fluids may include, but are not limited to oil/water ratio, density, chlorides content, electric stability, shear stress of the fluid, gel strength, plastic viscosity, and yield point.

In another embodiment, one or more sensors 113 may be located at predetermined intervals in the wellbore 130 (e.g., in the annulus 115). The sensors 113 may measure one or more of a bottom hole pressure, a compressibility of the drilling fluid 102, the elasticity of the drill string 110, velocity (RPM) of the drill string 102 in the wellbore 130, and/or the friction pressure due to resistance to flow of the drilling fluid 102 through the wellbore 130 or the displacement of the drill string 110 through the wellbore 130. Although not illustrated, one or more sensors 113 may also be located on the surface to measure the velocity of the drill string 110 at or above the surface. The sensors 113 may transmit the measurements to an information handling system (IHS) 165 using various forms of telemetry (acoustic, pressure pulse, electromagnetic, optical, wired, etc.). The IHS 165 may use the transmitted measurements to control the operation of the adjustable choke 180.

In an embodiment, measurements from the sensors 156, 157, and 113 may be transmitted (e.g., wirelessly or in a wired manner) to a real-time control system, also called a controller 190. The controller 190 may comprise a data acquisition module 170 for interfacing sensor measurements to the IHS 165. In one example, the real-time sensor measurements from the sensors 156, 157, and 113 may be transmitted to the information handling system (IHS) 165 for use in real-time control of the adjustable choke 180. The IHS 165 may comprise random access memory (RAM) 168, one or more processing resources such as a central processing unit (CPU) 167, hardware and/or computer software application, read only memory (ROM), and/or other types of non-transitory computer-readable storage medium such as optical devices (e.g., CDs or DVDs), and disk drives. Additional components of the IHS 165 may comprise one or more network ports for communicating with external devices as well as various input and output (I/O) devices 160, for example a keyboard, a mouse, and a video display. The IHS 165 may also comprise one or more buses operable to transmit communications between the various hardware components. In addition, the IHS 165 may comprise suitable interface circuits 169 for communicating and receiving data from sensors and/or the data acquisition module 170 at the surface and/or downhole. Additionally, the controller 190 may have stored information in a database 172 interfaced to the IHS 165. For example, the database 172 may comprise data related to other rig sensors, well geometry, offset well historical data, and/or other drilling fluid parameters used in the models.

In an embodiment, the IHS 165 may have programmed instructions, including one or more real-time hydraulics software models 171 and one or more real-time torque and drag models 173 stored in the memory 168 that, when executed, may transmit control instructions to the controller module 176 to autonomously (e.g., without the requirement for an input from an operator) operate the actuator 175 to control the operation of the adjustable choke 180, based, at least in part, on factors such as the real-time measured density and rheological properties of the drilling fluid 102, the compressibility of the drilling fluid 102, the elasticity of the drill string 110, and/or the dynamic motions of drilling string 110 and drilling fluid 102 (e.g., during tripping of the drill string 110 in the wellbore 130). The real-time torque and drag model 173 may solve the full balance of mass and balance of momentum for pipe and annulus flow, considering one or more of the above-mentioned factors. Also considered are surge pressures related to fluid column length below the moving drill string 110, compressibility of the formation A, and/or the axial elasticity of the moving drill string 110. The real-time data may be measured at one or more locations in the wellbore 130 and transmitted wirelessly or in a wired manner from the wellbore to the IHS 165, and may be used by the hydraulics model 171 and the torque and drag model 173 when determining the wellhead pressure (WHP) set point.

In one example, the controller module 176 may be a programmable logic controller that accepts the wellhead pressure set point values from the IHS 165 and controls the adjustable choke 180 to maintain that wellhead pressure. In an embodiment, wellhead pressure may be maintained by circulating drilling fluid in the upper portion of the wellbore. In another embodiment, the wellhead pressure set point values may be transmitted by the IHS 165 immediately (e.g., prior to performing other tasks) after calculation or may be transmitted after a predefined time delay. While the elements 170, 165, and 176 are depicted separately in FIG. 1, those skilled in the art will appreciate that any, or all, of them could be combined into a single element designated as the controller 190. Alternatively, many of the functions of IHS 165 may be contained in a stand-alone version of the controller module 176.

In an embodiment, the real-time hydraulics model 171 may receive notification from the IHS 165 that new density and rheology input data are available. The new data may be imported into the real-time hydraulics model 171 and used for calculating the hydrostatic pressures of the fluid based, at least in part, on fluid compressibility, real-time rheology, and thermal effects of the wellbore. Further, the inputs to the real-time hydraulics model 171 may include one or more of survey data, casing/hole section lengths, pipe outer diameter (OD), inner diameter (ID), and temperature profiles. Such a hydraulics model, as described above, may take into account changes in the drilling fluid 102, for example, cuttings loading and fluid compressibility, as the drilling fluid 102 transits the flow system 100 in the wellbore 130.

Note that multiple volumes of drilling fluid 102, each with different properties, may be transiting the system 100 at any time. The real-time hydraulics model 171 tracks each volume and uses the density and rheological properties associated with that fluid volume, to calculate the pressure drops associated with each volume of fluid as they progress through the closed flow system 100. The pressure losses of the system 100 may comprise pressure losses associated with the surface equipment, the drill string 110, the BHA 125, the LWD/MWD tools 126, the hole reamers, the drill bit 120, and the annulus 115. The sum of the pressure losses will provide a calculated standpipe pressure. The annular pressure loss will be utilized by the MPD system 100 by the following equation:

Surface/Well Head Pressure (WHP)=Desired Downhole Pressure (DDP)−Hydrostatic Pressure−Fluid Circulating Friction (ECD)−Surge/Swab Pressures The real-time hydraulics model 171 may calculate surge/swab pressures to control the bottom hole pressures. In an embodiment, the surge/swab pressures may be calculated based, at least in part, on a form of Hershel-Bulkley's surge/swab calculations. Tripping of the drill string 110 may cause additional pressure variations in the wellbore 130. The movement of the drill string 110 when pulling out of the wellbore 130 may cause the pressure of the drilling fluid 102 on the bottom of the wellbore 130 to decrease due to friction between the movement of the drill string 110 and the drilling fluid 102. This is referred to as swab pressure ($P_{swab}$). Conversely, movement of the drill string 110 running into the wellbore 130 may cause the pressure to increase. This is referred to as surge pressure ($P_{surge}$). As will be appreciated, the $P_{swab}$ and $P_{surge}$ pressures may impact displacement of drilling fluid 102 caused by drill string 110 movement (e.g., piston effect) in a fluid-filled wellbore 130.

The torque and drag model 173 may compensate for pressure variations due to drill pipe movement by calculating the elasticity of the drill string 110. The movement of the drill string 110 may not be homogeneous or in a steady state due to factors such as the tortuosity of the wellbore 130. This is due to the elasticity of the drill string 110 and/or the mechanical forces and forces due to the drilling fluid 102. Thus, the velocity or the movement of the drill string 110 at the downhole end thereof may not be equal to the velocity of the drill string 110 at the surface. As a result, portions of the drill string 110 may accelerate and de-accelerate at different speeds and also at different times. Further, the drill string 110 may be in tension and compression at the same time.

The torque and drag model 173 performs wellbore pressure calculations caused by movement of the drill string 110 inside the wellbore 130 based on an analysis of fluid flow and motion of the drill string 110. The torque and drag model 173 preferably solves the full balance of mass and balance of momentum for drill string 110 and flow in the annulus 115, while taking into consideration the compressibility of the drilling fluid 102, the elasticity of the drill string 110, and the dynamic motions of the drill string 110 and the drilling fluid 102. Also considered are surge pressures related to fluid column length below the moving drill string 110 and compressibility of the formation A being drilled. Fluid properties may be adjusted to reflect the effects of pressure and temperature on the drilling fluids 102.

The torque and drag model 173 calculations are divided into two regions: the upper region from the surface of the well 105 to the downhole end of the drill string 110, and the interval from the downhole end of the drill string 110 to bottom of the wellbore 130. In the upper region, pressure experienced by the drill string 110 along the axial length thereof may be coupled to annulus pressures through the radial elasticity of the drill string 110. The axial dynamic response of the drill string 110 is given by the following set of equations:

$$\text{Momentum Equation: } \rho A \frac{\delta v}{\delta t} = \frac{\delta F}{\delta x} \quad \text{Equation (1)}$$

$$\text{Linear elasticity Equation: } \frac{\delta F}{\delta T} = A \times E \frac{\delta v}{\delta x} \quad \text{Equation (2)}$$

$$\text{Bulk Modulus of Elasticity: } K = -\frac{\frac{dp}{dV}}{V} = \frac{\frac{dp}{d\rho}}{\rho} \quad \text{Equation (3)}$$

where, v=surface velocity of the drill string; ρ=density of the drilling fluid; A=cross-sectional area of the drill string; E=Young's modulus of the drill string; x=length of the wellbore; F=axial frictional force being exerted on the drill string in the wellbore; and t=time (at which the drill string starts moving).

The expansion of the drill string is considered as:

$$\frac{1}{A}\frac{\delta A}{\delta P} = \frac{2}{E}\left|\frac{r_2^2 + r_1^2 + \mu(r_2^2 + r_1^2)}{r_2^2 - r_1^2}\right| \quad \text{Equation (4)}$$

where, A=cross-sectional area of the drill string; $r_2$=outer radius of the drill string; $r_1$=inner radius of the drill string; and μ=viscosity of the drilling fluid.

Because of the elasticity of the drill string 110 and the pressure experienced by the drill string 110 along the axial length thereof, the drill string 110 may expand and contract in the wellbore 130. Due to the expansion and contraction of the drill string 110 in the wellbore 130, the cross-sectional area of the drill string 110 and the cross-sectional area of the annulus 115 may vary. Consequently, this may result in a change in the pressure of the drilling fluid, which may further result in a change in the length of the drill string 110.

The torque and drag model 173 may also consider the effect of wellbore deviation and drill pipe eccentricity. In situations where casing is run in a wellbore with small annular clearances, the torque and drag model 173 may take into account the frictional force experience by the drill string 110 during motion. The drilling fluid movement and the pressure losses in an eccentric annulus are different from those in a concentric annulus. Excluding the frictional forces from the torque and drag model 173 may underestimate the axial force on the drill string 110, which may result in incorrect control instructions being transmitted to the controller module 176.

Figure 2A:
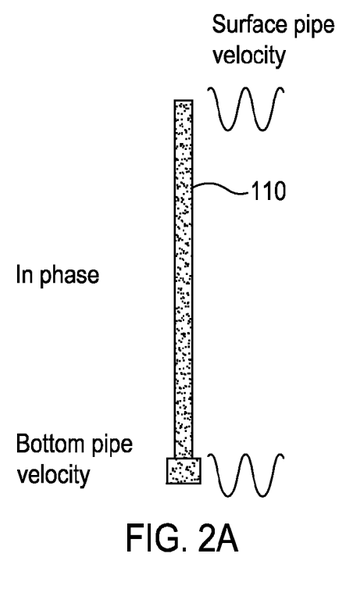
FIGS. 2A-2G illustrate different combinations of sea wave heave and drill string velocities.
Figure 2B:
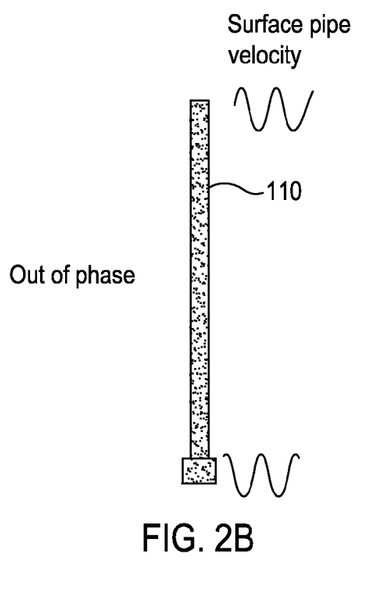

Further, the torque and drag model 173 may take into account the elasticity of the drill string 110 under different combinations of heave (due to sea waves) and drill string velocities, as illustrated in FIGS. 2A-2G. The depicted sinusoidal waves represent the velocities of the drill string 110 and heave at the uphole and downhole ends of the drill string 110, and are purely for the sake of explanation. FIG. 2A illustrates the surface velocity of the drill string 110 (also referred to as a pipe in FIGS. 2A-2G) and the bottom velocity of the drill string 110 in phase with each other. In other words, when the end of the drill string 110 above the surface goes up, the end of the drill string 110 in the well 105 also goes up, and vice-versa. FIG. 2B illustrates the surface velocity of the drill string 110 and the bottom velocity of the drill string 110 as out of phase with each other. In other words, the end of the drill string 110 above the surface does not follow the end of the drill string 110 in the well 105.

Figure 2C:
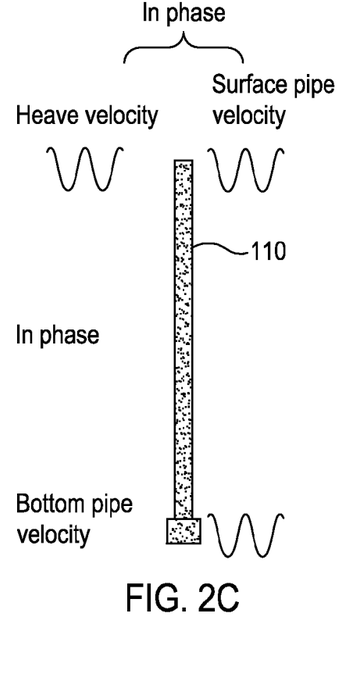
Figure 2D:
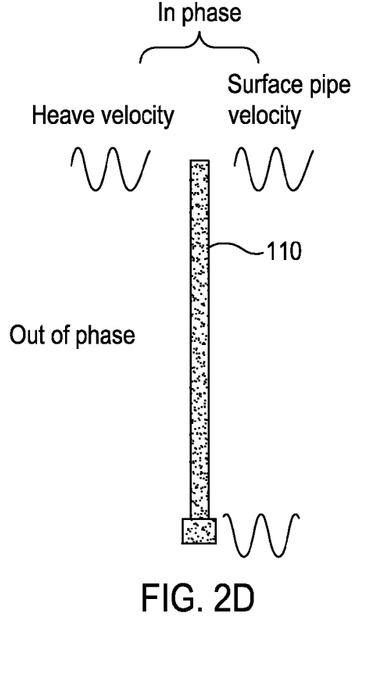
Figure 2E:
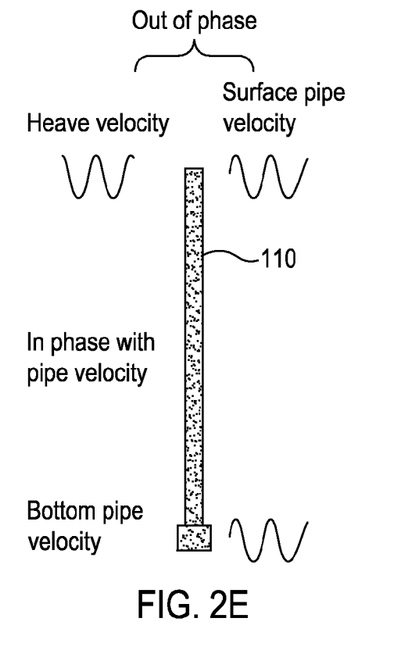
Figure 2F:
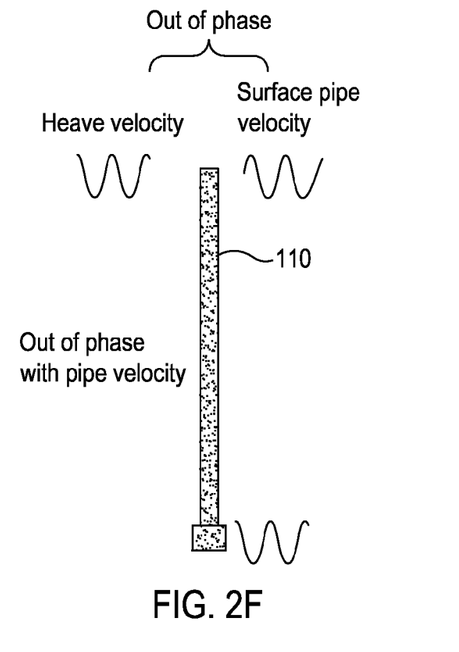
Figure 2G:
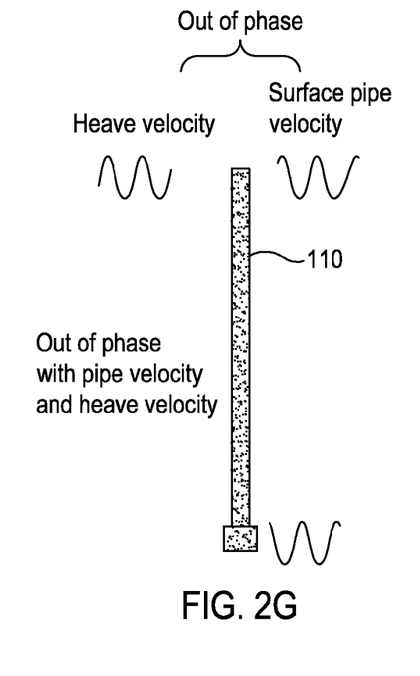

FIG. 2C illustrates the heave velocity (e.g., the velocity of the sea waves), the surface velocity of the drill string 110, and the bottom velocity of the drill string 110 in phase with each other. In FIG. 2D, the heave velocity and the surface velocity of the drill string 110 are in phase with each other, while the bottom velocity of the drill string 110 is out of phase with both the heave velocity and the surface velocity of the drill string 110. In FIG. 2E, the heave velocity and the surface velocity of the drill string 110 are out of phase with each other, and the bottom velocity of the drill string 110 is in phase with the surface velocity of the drill string 110. In FIG. 2F, the heave velocity and the surface velocity of the drill string 110 are out of phase with each other, and the bottom velocity of the drill string 110 is out of phase with the surface velocity of the drill string 110, and in phase with the heave velocity. Finally, in FIG. 2G, the heave velocity and the surface velocity of the drill string 110 are out of phase with each other, and the bottom velocity of the drill string 110 is out of phase with both the heave velocity and the surface velocity of the drill string 110.

As seen, due to the elasticity of the drill string 110, the end of the drill string 110 in the well 105 may not always follow (or be in synchronization with) the end of the drill string 110 above the well surface. The elasticity of the drill string 110 may result in different $P_{swab}$ and $P_{surge}$ pressures at different locations in the wellbore 130. For instance, while the end of the drill string 110 above the surface in the well 105 may be going up (or swabbing), the end of the drill string 110 in the well 105 may be going down (or surging). This may result in a $P_{swab}$ swab pressure at or adjacent the surface of the well 105 and a $P_{surge}$ pressure at or adjacent the bottom of the well 105. Additionally, the drill string 110 may be swabbing or surging at one or more locations between the surface and the bottom of the wellbore 130 resulting in different $P_{swab}$ and $P_{surge}$ pressures at those locations.

The torque and drag model 173 may be able to predict, with a relatively high accuracy and in a relatively short time duration, the desired downhole pressure required at the predetermined location for a given combination of heave and drill string velocities. The torque and drag model 173 may transmit control instructions to the controller 176 to adjust the surface pressure to achieve the desired downhole pressure. The torque and drag model 173 may also be able to predict with relatively high accuracy how the velocity of the drill string 110 in the wellbore 130 due to a sea heave affects the wellhead set point pressure on the surface. The response of the drill string 110 in the wellbore 130 may vary depending on the depth of the wellbore 130, and torque and drag model 173 may take into consideration the depth of the wellbore 130 when determining the wellhead set point pressure on the surface.

Referring again to FIG. 1, the hydraulics model 171 and the torque and drag model 173 may be configured to generate a pressure profile in the annulus 115 that may be compared to the pore pressure and fracture pressure at desired locations along the well 105. The calculated WHP set point may then be transmitted from the real-time hydraulics model 171 and the torque and drag model 173 in the IHS 165 to the controller module 176. The controller module 176 directs the actuator 175 to adjust the adjustable choke 180 to achieve a wellhead pressure at pressure sensor 185 approximately equal to the calculated set point pressure. As indicated above, the calculated set point pressure imparts a surface pressure on the annulus 115 such that results in the desired downhole pressure (DDP) at a predetermined location along the annulus 115. The DDP may comprise a predetermined pressure in a range that is less than the fracture pressure and greater than, or equal to, the pore pressure of the surrounding formation A.

As the real-time density and rheological properties of the drilling fluid 102, the compressibility of the drilling fluid 102, the elasticity of the drill string 110, and/or the dynamic motions of drill string 110 and drilling fluid 102 change, they are detected and the new values are inputted into the real-time hydraulics model 171 and the real time torque and drag model 173. The models 171, 173 may be programmed to calculate a modified flow control apparatus set point, which may be transmitted to the controller 176 to adjust the surface pressure to achieve the desired downhole pressure at the predetermined location. In an embodiment, a back pressure pump 140 may be used to help maintain the calculated WHP, for example, when there is little or no flow of drilling fluid 102.

There is a continual two-way transfer of data and information between the models 171, 173 and the data acquisition module 170 and controller 176 through IHS 165. The data acquisition module 170 and the IHS 165 operate to maintain a continual flow of real-time data from the sensors 156, 157, and 113 to the models 171, 173 so that the models 171, 173 may be calibrated to actual wellbore conditions, and may update the desired wellhead set point pressure that results for a predetermined pressure at a predetermined downhole location. The hydraulics model 171 operates to supply the controller 176 continually with a real-time value for the desired wellhead set point pressure that results in the desired downhole pressure at the predetermined location.

Figure 3:
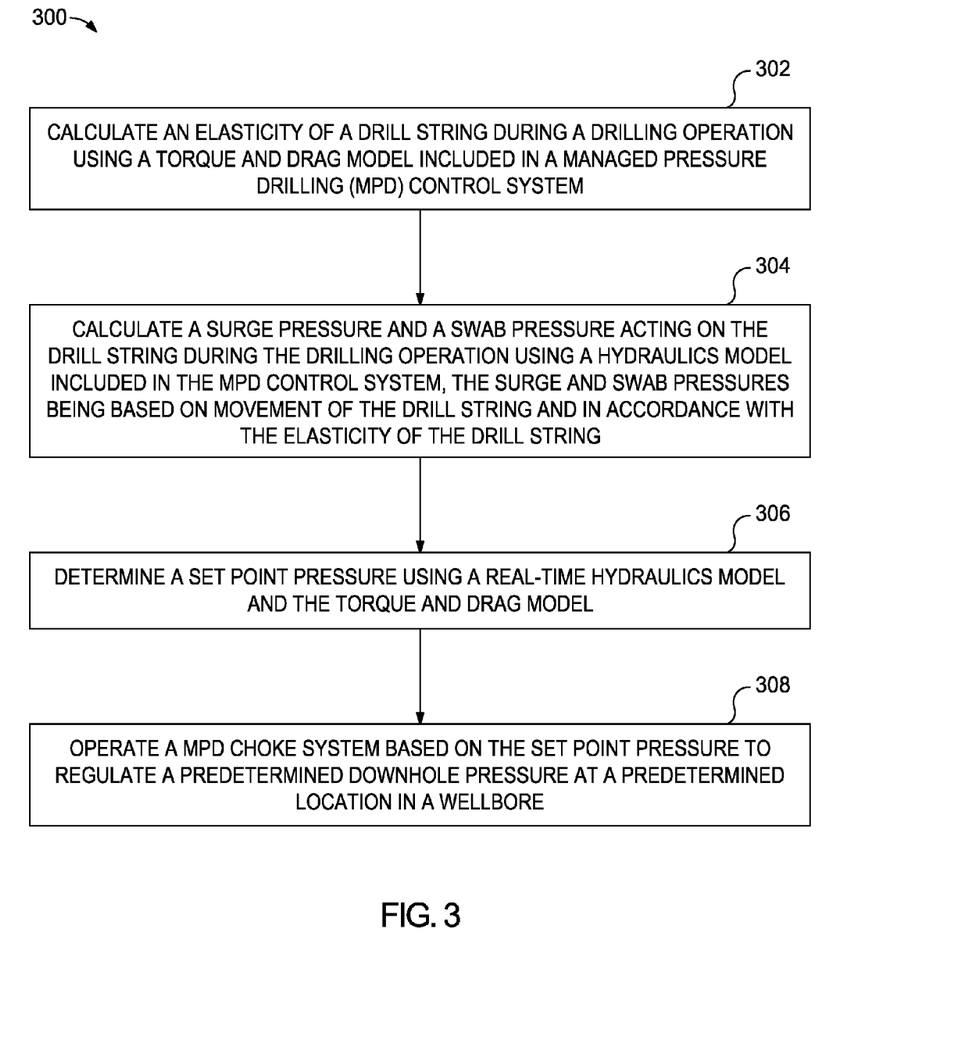
FIG. 3 is a flowchart of an exemplary method for regulating wellbore pressure.

FIG. 3 is a flowchart of an exemplary method 300 for regulating wellbore pressure. The method 300 may include calculating an elasticity of a drill string during a drilling operation using a torque and drag model included in a managed pressure drilling (MPD) control system, as at 302, and calculating a surge pressure and a swab pressure acting on the drill string during the drilling operation using a hydraulics model included in the MPD control system, as at 304. The surge and swab pressures may be based on a movement of the drill string and in accordance with the elasticity of the drill string. The method 300 may further include determining a set point pressure using a real-time hydraulics model and the torque and drag model, as at 306, and operating a MPD choke system based on the set point pressure to regulate a predetermined downhole pressure at a predetermined location in a wellbore, as at 308.

Embodiments disclosed herein include:

A. A method that includes calculating an elasticity of a drill string during a drilling operation using a torque and drag model included in a managed pressure drilling (MPD) control system, calculating a surge pressure and a swab pressure acting on the drill string during the drilling operation using a hydraulics model included in the MPD control system, the surge and swab pressures being based on movement of the drill string and in accordance with the elasticity of the drill string, determining a set point pressure using a real-time hydraulics model and the torque and drag model, and operating a MPD choke system based on the set point pressure to regulate a predetermined downhole pressure at a predetermined location in a wellbore.

B. A drilling system for managed pressure drilling that includes one or more sensors continually sensing in real-time at least one fluid property of a drilling fluid entering and exiting a well, a flow control apparatus positioned in a return flow line to regulate a flow of the drilling fluid exiting the wellbore, and a controller operably connected to the flow control apparatus and controlling the flow control apparatus to regulate a predetermined downhole pressure at a predetermined location in the wellbore, wherein the controller provides control instructions to the flow control apparatus based on an elasticity a drill string calculated by a torque and drag model, and a surge pressure and a swab pressure acting on the drill string during drilling operations as calculated by a hydraulics model, and wherein the surge and swab pressures are based on a movement of the drill string and in accordance with the elasticity of the drill string.

C. A computer program product including a non-transitory computer readable medium having computer readable computer program code stored thereon that, when executed by a computer, configures the computer to calculate an elasticity of a drill string during a drilling operation using a torque and drag model included in a managed pressure drilling (MPD) control system, calculate a surge pressure and a swab pressure acting on the drill string during the drilling operation using a hydraulics model included in the MPD control system, the surge and swab pressures being based on movement of the drill string and in accordance with the elasticity of the drill string, determine a set point pressure using a real-time hydraulics model and the torque and drag model, and operate a MPD choke system based on the set point pressure to regulate a predetermined downhole pressure at a predetermined location in a wellbore.

Each of embodiments A, B, and C may have one or more of the following additional elements in any combination: Element 1: wherein operating the MPD choke system includes regulating the predetermined downhole pressure by controlling a flow of drilling fluid exiting the wellbore. Element 2: wherein determining the set point pressure includes obtaining a real-time density of the drilling fluid, obtaining at least one rheological property of the drilling fluid entering and exiting the wellbore, and calculating the set point pressure based at least in part on the real-time density and the at least one rheological property of the drilling fluid using the real-time hydraulics model. Element 3: wherein the at least one rheological property includes at least one of oil/water ratio, chlorides content, electric stability, shear stress, gel strength, plastic viscosity, yield point, and combinations thereof. Element 4: wherein the predetermined downhole pressure is less than a fracture pressure of a formation being drilled and greater than, or equal to, a pore pressure of the formation. Element 5: determining the set point pressure at least in part on a compressibility of drilling fluid and friction pressure due to circulation of the drilling fluid through the wellbore using the torque and drag model. Element 6: determining the set point pressure at least in part on a velocity of the drill string at or above a surface of the well and a velocity of the drill string in the wellbore using the torque and drag model. Element 7: calibrating the hydraulics model to actual wellbore conditions in real-time using information obtained from the wellbore, the information including survey, temperature, pressure, and downhole tool data. Element 8: obtaining the information with one or more downhole measuring devices. Element 9: calibrating the torque and drag model to actual wellbore conditions in real-time using one or more of a friction pressure acting on the drill string, a velocity of the drill string at or above a surface of the well, and a velocity of the drill string in the well bore. Element 10: autonomously regulating the predetermined downhole pressure by controlling a flow of drilling fluid exiting the wellbore to maintain the set point pressure.

Element 11: wherein the predetermined downhole pressure is regulated by controlling a flow of drilling fluid exiting the wellbore. Element 12: wherein the at least one fluid property of the drilling fluid includes a density of the drilling fluid and at least one rheological property of the drilling fluid entering and exiting the wellbore. Element 13: wherein the at least one rheological property includes at least one of oil/water ratio, chlorides content, electric stability, shear stress, gel strength, plastic viscosity, yield point, and combinations thereof. Element 14: wherein the hydraulics model and the torque and drag model calculate a set point pressure required to maintain the predetermined downhole pressure and the predetermined downhole pressure is regulated by controlling a flow of drilling fluid exiting the wellbore. Element 15: wherein the predetermined downhole pressure is less than a fracture pressure of a formation being drilled and greater than, or equal to, a pore pressure of the formation.

Element 16: wherein the computer is further configured to operate the MPD choke system to regulate the predetermined downhole pressure by operating the MPD choke system to control a flow of drilling fluid exiting the wellbore. Element 17: wherein the computer is further configured to determine the set point pressure by obtaining real-time density of the drilling fluid, obtaining at least one rheological property of the drilling fluid entering and exiting the wellbore using the real-time hydraulics model, and calculating the set point pressure based at least in part on the real-time density and the at least one rheological property of the drilling fluid using the real-time hydraulics model. Element 18: wherein the computer is further configured to regulate the predetermined downhole pressure such that the predetermined downhole pressure is less than a fracture pressure of a formation being drilled and greater than, or equal to, a pore pressure of the formation. Element 19: wherein the computer is further configured to calibrate the hydraulics model to actual wellbore conditions in real-time using information obtained from the wellbore, the information including survey, temperature, pressure, and downhole tool data. Element 20: wherein the computer is further configured to calibrate the torque and drag model to actual wellbore conditions in real-time using one or more of a friction pressure acting on the drill string, a velocity of the drill string at or above a surface of the well and a velocity of the drill string in the well bore.

By way of non-limiting example, exemplary combinations applicable to A, B, and C include: Element 1 with Element 3; Element 7 with Element 8; and Element 12 with Element 13.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

What is claimed is:

1. A method, comprising:
    calculating an elasticity of a drill string during a drilling operation using a torque and drag model included in a managed pressure drilling (MPD) control system;
    calculating a surge pressure and a swab pressure acting on the drill string during the drilling operation using a hydraulics model included in the MPD control system, the surge and swab pressures being based on movement of the drill string and in accordance with the elasticity of the drill string;
    determining a set point pressure using a real-time hydraulics model and the torque and drag model; and
    operating a MPD choke system based on the set point pressure to regulate a predetermined downhole pressure at a predetermined location in a wellbore.

2. The method of claim 1, wherein operating the MPD choke system comprises regulating the predetermined downhole pressure by controlling a flow of drilling fluid exiting the wellbore.

3. The method of claim 1, wherein determining the set point pressure comprises:
    obtaining a real-time density of the drilling fluid;
    obtaining at least one rheological property of the drilling fluid entering and exiting the wellbore; and
    calculating the set point pressure based at least in part on the real-time density and the at least one rheological property of the drilling fluid using the real-time hydraulics model.

4. The method of claim 3, wherein the at least one rheological property comprises at least one of oil/water ratio, chlorides content, electric stability, shear stress, gel strength, plastic viscosity, yield point, and combinations thereof.

5. The method of claim 1, wherein the predetermined downhole pressure is less than a fracture pressure of a formation being drilled and greater than, or equal to, a pore pressure of the formation.

6. The method of claim 1, further comprising determining the set point pressure at least in part on a compressibility of drilling fluid and friction pressure due to circulation of the drilling fluid through the wellbore using the torque and drag model.

7. The method of claim 1, determining the set point pressure at least in part on a velocity of the drill string at or above a surface of the well and a velocity of the drill string in the wellbore using the torque and drag model.

8. The method of claim 1, further comprising calibrating the hydraulics model to actual wellbore conditions in real-time using information obtained from the wellbore, the information including survey, temperature, pressure, and downhole tool data.

9. The method of claim 8, further comprising obtaining the information with one or more downhole measuring devices.

10. The method of claim 1, further comprising calibrating the torque and drag model to actual wellbore conditions in real-time using one or more of a friction pressure acting on the drill string, a velocity of the drill string at or above a surface of the well, and a velocity of the drill string in the well bore.

11. The method of claim 1, further comprising autonomously regulating the predetermined downhole pressure by controlling a flow of drilling fluid exiting the wellbore to maintain the set point pressure.

12. A drilling system for managed pressure drilling, comprising:
    one or more sensors continually sensing in real-time at least one fluid property of a drilling fluid entering and exiting a well;
    a flow control apparatus positioned in a return flow line to regulate a flow of the drilling fluid exiting the wellbore; and
    a controller operably connected to the flow control apparatus and controlling the flow control apparatus to regulate a predetermined downhole pressure at a predetermined location in the wellbore,
    wherein the controller provides control instructions to the flow control apparatus based on an elasticity of a drill string calculated by a torque and drag model, and a surge pressure and a swab pressure acting on the drill string during drilling operations as calculated by a hydraulics model, and
    wherein the surge and swab pressures are based on a movement of the drill string and in accordance with the elasticity of the drill string.

13. The system of claim 12, wherein the predetermined downhole pressure is regulated by controlling a flow of drilling fluid exiting the wellbore.

14. The system of claim 12, wherein the at least one fluid property of the drilling fluid comprises a density of the drilling fluid and at least one rheological property of the drilling fluid entering and exiting the wellbore.

15. The system of claim 14, wherein the at least one rheological property comprises at least one of oil/water ratio, chlorides content, electric stability, shear stress, gel strength, plastic viscosity, yield point, and combinations thereof.

16. The system of claim 12, wherein the hydraulics model and the torque and drag model calculate a set point pressure required to maintain the predetermined downhole pressure and the predetermined downhole pressure is regulated by controlling a flow of drilling fluid exiting the wellbore.

17. The system of claim 12, wherein the predetermined downhole pressure is less than a fracture pressure of a formation being drilled and greater than, or equal to, a pore pressure of the formation.

18. A computer program product comprising a non-transitory computer readable medium having computer readable computer program code stored thereon that, when executed by a computer, configures the computer to:
   calculate an elasticity of a drill string during a drilling operation using a torque and drag model included in a managed pressure drilling (MPD) control system;
   calculate a surge pressure and a swab pressure acting on the drill string during the drilling operation using a hydraulics model included in the MPD control system, the surge and swab pressures being based on movement of the drill string and in accordance with the elasticity of the drill string;
   determine a set point pressure using a real-time hydraulics model and the torque and drag model; and
   operate a MPD choke system based on the set point pressure to regulate a predetermined downhole pressure at a predetermined location in a wellbore.

19. The computer program product of claim 18, wherein the computer is further configured to operate the MPD choke system to regulate the predetermined downhole pressure by operating the MPD choke system to control a flow of drilling fluid exiting the wellbore.

20. The computer program product of claim 18, wherein the computer is further configured to determine the set point pressure by obtaining real-time density of the drilling fluid, obtaining at least one rheological property of the drilling fluid entering and exiting the wellbore using the real-time hydraulics model, and calculating the set point pressure based at least in part on the real-time density and the at least one rheological property of the drilling fluid using the real-time hydraulics model.

21. The computer program product of claim 18, wherein the computer is further configured to regulate the predetermined downhole pressure such that the predetermined downhole pressure is less than a fracture pressure of a formation being drilled and greater than, or equal to, a pore pressure of the formation.

22. The computer program product of claim 18, wherein the computer is further configured to calibrate the hydraulics model to actual wellbore conditions in real-time using information obtained from the wellbore, the information including survey, temperature, pressure, and downhole tool data.

23. The computer program product of claim 18, wherein the computer is further configured to calibrate the torque and drag model to actual wellbore conditions in real-time using one or more of a friction pressure acting on the drill string, a velocity of the drill string at or above a surface of the well and a velocity of the drill string in the well bore.

* * * * *